United States Patent Office 3,849,339
Patented Nov. 19, 1974

3,849,339
METHOD OF PREPARING AN IMPROVED DEHYDROGENATION CATALYST
Robert R. Turley, Lake Jackson, William M. Castor, Clute, and Kenneth R. Nunnally, Brazoria, Tex., assignors to The Dow Chemical Company, Midland, Mich.
Continuation-in-part of application Ser. No. 53,881, July 10, 1970, now Patent No. 3,703,593. This application Sept. 14, 1972, Ser. No. 288,915
The term of this patent subsequent to Nov. 21, 1989 has been disclaimed
Int. Cl. B01j 11/22
U.S. Cl. 252—455 R        5 Claims

ABSTRACT OF THE DISCLOSURE

A method for preparing an improved dehydrogenation catalyst comprising iron oxide, an alkali metal oxide, and a chromium compound wherein an improvement is achieved by employing both yellow and red iron oxides in particular proportions with respect to each other in the preparation of the catalyst.

CROSS-REFERENCE TO RELATED APPLICATION

Figure 1:
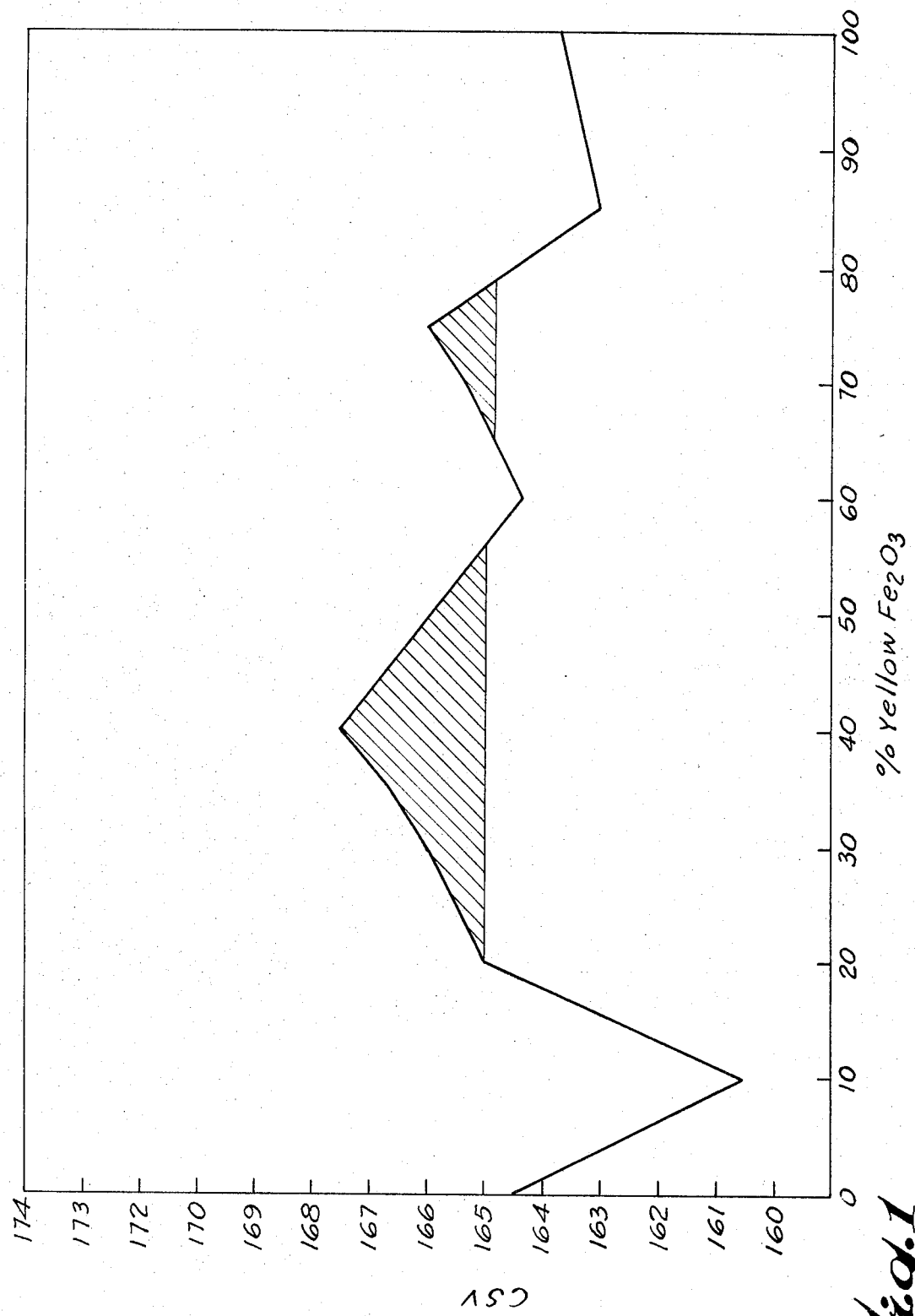

The present application is a continuation-in-part of our previous application Ser. No. 53,881, filed July 10, 1970, now Pat. No. 3,703,593.

BACKGROUND OF THE INVENTION

Catalytic dehydrogenation of ethylbenzene to styrene is an old and highly successful commercial process. Numerous catalyst compositions have been found useful through the years from just prior to World War II to the present. Most of the catalysts now in commercial use are based on iron oxide as the major component with minor amounts of promoters, e.g. salts or oxides of chromium, manganese, bismuth, tungsten, or molybdenum, chromium being preferred and a compound of potassium, e.g. potassium oxide or carbonate. Such catalysts are known as self-regenerative catalysts and can be used for long periods of time without loss in activity. Relatively recent improvements have seen the incorporation of minor amounts of vanadium (U.S. 3,084,125) and of modifiers (such as carbon black or graphite and methyl cellulose) which affect the pore structure of the catalysts (U.S. 3,084,125). One recent development shows the use of yellow iron oxide exclusively (U.S. 3,360,579) in place of the red iron oxide normally used in preparing the catalyst. Another characteristic of the better dehydrogenation catalysts is that of low surface area, i.e. less than 10 m.$^2$/g. Low surface area is normally achieved by employing high temperature calcining (>700° C.) and/or by the use of cement as a binder which modifies the pores of the catalytic mass and improves the conversion without sacrificing yield.

The process of dehydrogenation of alkyl aromatic hydrocarbons such as ethylbenzene using these catalysts involves feeding a hydrocarbon stream containing substantial amounts of ethylbenzene or other alkyl aromatic hydrocarbon together with super-heated steam as a source of energy to produce the proper temperature of reaction over the catalyst bed. A molar excess of steam, i.e. 2–20 moles of steam per mole of ethylbenzene is preferred and a reaction temperature of between about 600 and about 800° C. is normally employed. Conversions of 35% to 50% are usually obtained depending upon the catalyst employed and reaction conditions, e.g. ratios of steam to hydrocarbon, composition of the hydrocarbon stream, temperature and pressure. Yields or selectivities to styrene or other vinyl aromatic hydrocarbon in the order of 90% are normally obtained but it has been generally accepted that as the conversion increases the yield or selectivity to the desired vinyl aromatic hydrocarbon decreases.

It would be highly desirable if conversions of 60% or more could be attained consistently with yields or selectivities of 90% or above, but the art has thus far been able to achieve such relatively high conversions only at the expense of reduced yields of substantially below 90%.

SUMMARY

It has now been discovered that by preparing an alkalized iron oxide catalyst which employs particular ratios of yellow iron oxide to red iron oxide as starting materials, a superior catalyst is produced which is capable of achieving higher conversions of the alkyl aromatic hydrocarbon while maintaining a high yield to the desired vinyl aromatic hydrocarbon.

Figure 2:
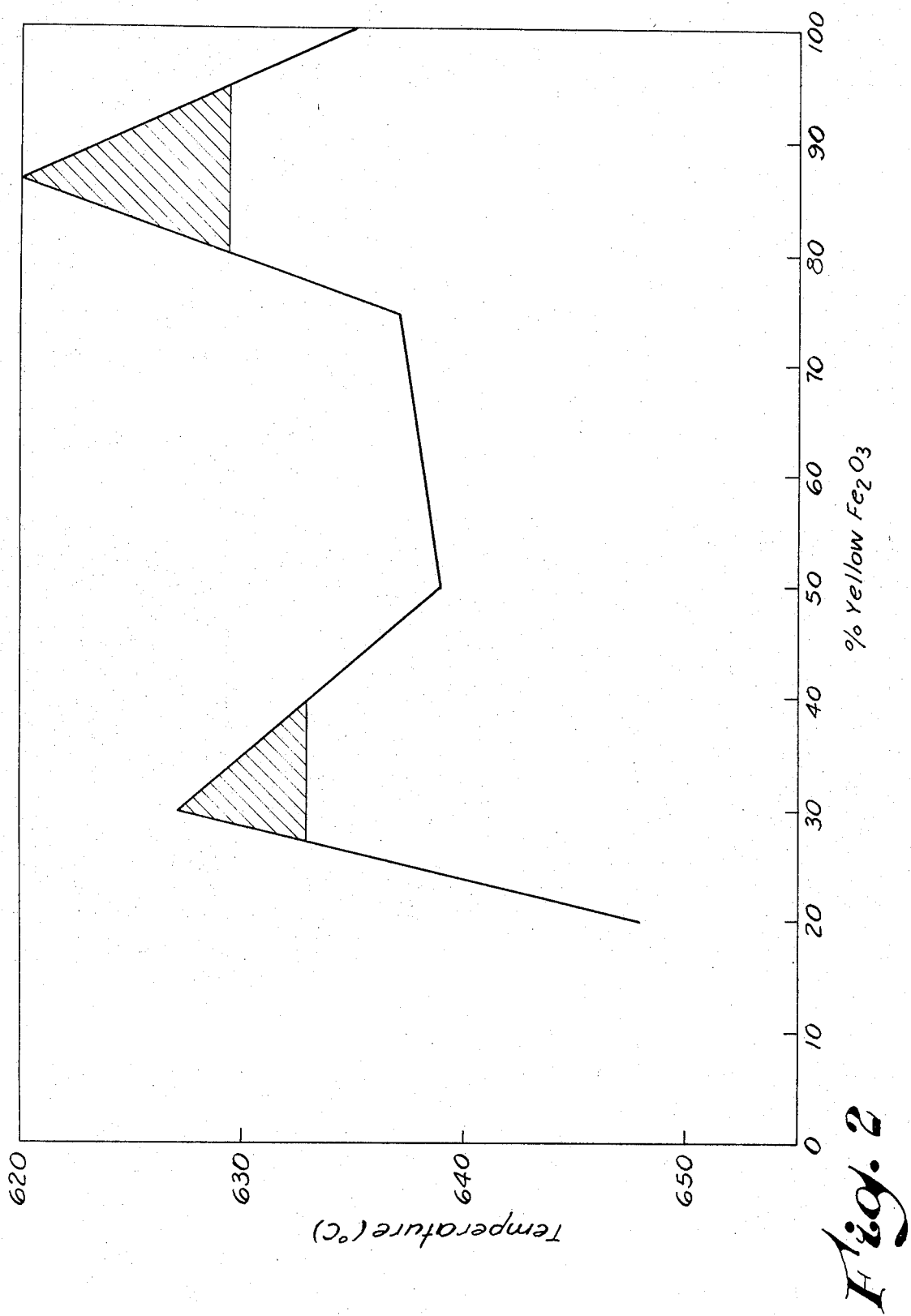

FIG. 1 shows a curve, illustrative of the results when employing the adiabatic reaction conditions of Examples 1–3, and FIG. 2 illustrates the results of Example 4 for isothermal conditions. It can be seen that the lower range in the curve of FIG. 1 is to be preferred to the upper range. while the upper range of the curve in FIG. 2 is the preferred one. Nevertheless, both ranges in each of the curves show superiority over the known art and show the unexpected result of combining the two types of iron oxide to make the dehydrogenation catalyst.

DETAILED DESCRIPTION

In accordance with the process of this invention, the novel catalyst is prepared by employing, as the Fe$_2$O$_3$ component, a mixture of hydrated (yellow) iron oxide and anhydrous (red) iron oxide within the ranges of from about 20% to about 56% by weight and from about 65% to about 79% by weight of yellow iron oxide based on the total iron oxides present. This mixture of iron oxides is combined with a minor amount of an oxide of an alkali metal, preferably potassium oxide, or an oxide former such as the carbonate, a minor amount of chromium oxide or an alkali metal chromate or dichromate and a suitable binder such as a refractory cement. The binder is employed in an amount of from about 1 to 5%, preferably 2–4%, based on total weight of active components and binder. Alternatively, the catalyst may contain catalytic modifiers such as vanadium oxide or an oxide of manganese, cobalt, copper or zinc. In the preparation of the catalyst of this invention it is preferred in some cases to employ, as ingredients in the catalyst paste, from about 5 to about 15 weight percent each of methyl cellulose and carbon or graphite to provide strength and coherence to the catalyst paste, to improve extrusion or pelletizing characteristics and to provide control of the porosity produced in the catalyst pellets during calcining. The amounts of methyl cellulose and carbon employed are based on the total weight of dry ingredients in the paste, i.e. the weight of active components and binder, and includes that water present in the hydrated Fe$_2$O$_3$ (yellow oxide). The use of such materials in dehydrogenation catalysts is shown in U.S. 2,603,610.

It is preferred to use methyl cellulose and carbon additives in catalysts which are intended for use under adiabatic reaction conditions, but these are omitted when the catalyst is to be used in the reaction wherein heated case (isothermal) conditions are employed. It is not known what physical effects upon the structure of the final catalyst result from making the catalyst paste of a specific mixture of yellow iron oxide and red iron oxide. It is known, however, as will be demonstrated, that any such mixture within the defined proportions will, when employed in combination with the other essential ingredients of a self-regenerating dehydrogenation catalyst, produce an improved catalyst capable of producing higher conversions without any substantial loss of yield.

The terms "yellow iron oxide" and "hydrated $Fe_2O_3$" are used synonymously herein to refer to the form of $Fe_2O_3$ which appears in a variety of colors ranging from light yellow to a deep yellow-orange. Such yellow iron oxides are substantially monohydrates and have a water content of about 13% by weight.

The terms "red iron oxide" and "anhydrous $Fe_2O_3$" are used synonymously herein to refer to the substantially anhydrous $Fe_2O_3$ which is red or red-brown in color.

In accordance with this invention and to achieve the advantages thereof it is necessary to employ a mixture of hydrated $Fe_2O_3$ and anhydrous $Fe_2O_3$ in the wet catalyst mixture which contains from about 20% to 56% by weight of the yellow (or hydrated) iron oxide based on the total weight of $Fe_2O_3$ used, and preferably from about 35% to 43%. The advantages of this range are best achieved using the reaction parameters employed in an adiabatic reactor system.

There is a second range of proportions of yellow to red oxides useful under adiabatic reactor conditions. The second range employs an amount of yellow oxide of from about 65% to about 79% based on the total weight of red and yellow $Fe_2O_3$ used in making the catalyst paste. A preferred narrower range of proportions is from about 70% to about 75% of the yellow iron oxide. Although both the above operable and preferred ranges are improvements over the art, the maximum improvement is found in the lower range of proportions, i.e. 20 to 56%.

In the use of dehydrogenation catalysts in heated case (isothermal) reactors, which employ quite different conditions from those useful in adiabatic reactors, there are two additional ranges of proportions of yellow to red $Fe_2O_3$ employed in the making of the catalysts. The lower range of proportions lies within the operable range of proportions employed in making the adiabatic catalysts. Thus, the proportion of yellow iron oxide employed in preparing the heated case catalyst is from about 27% to about 40% based on the total weight of iron oxide. A more preferred range is from about 29% to about 35% of the yellow oxide.

There is a second and more preferred range which achieves maximum benefits in the isothermal process. The operable range here employs from about 79% to about 95% of the yellow oxide based on the total weight of $Fe_2O_3$ employed to make the catalyst. Within the operable range is a preferred range of from about 83% to about 90%. All of the above operable ranges are shown in the drawings.

It should be pointed out that the graphite and methyl cellulose employed in the preparation of the adiabatic catalysts are not used in preparing the catalysts for the heated case reactor. The only control of porosity is through the use of cement which also acts as a binder.

The reaction conditions for the adiabatic system taught in the published literature employ a steam to ethylbenzene weight ratio (commonly referred to a steam to oil, or S/O, ratio) of about two to three or more pounds of steam per pound of ethylbenzene and a liquid hourly space velocity (L.H.S.V.), expressed as volumes of hydrocarbon fed per hour per volume of catalyst, of about 0.46 to about 0.65. The present examples employ a somewhat higher space velocity of about one.

The steam/ethylbenzene weight ratio employed in the heated case reactors is about one, with appropriate space velocities usually somewhat lower than those of the adiabatic reactor. In either case the L.H.S.V. depends upon other factors such as the temperature of the steam employed and activity of the catalyst.

Regardless of which the reactor systems is employed, i.e. adiabatic or heated case, the maximum benefits of the invention are obtained when conversions of 60% and above are used. Thus, the real improvement over the art is obtaining catalysts which give high conversions while maintaining the yield above 90%.

The two forms of $Fe_2O_3$ first may be mixed together in the proper proportions and such mixture admixed with the other ingredients of the catalyst paste or the two forms of $Fe_2O_3$ may be added separately to the other ingredients and blended to form the final mixture.

While the order of addition of the components of the catalyst paste is not extremely critical and depends to a large extend on the composition of the catalyst being prepared, the general procedure is to dissolve the water-soluble components in water and add thereto the water insoluble components. Sufficient water must be present to form a paste.

The amount of water ordinarily used is within the range of 10% to 50% (exclusive of water of hydration). In order to attain a homogeneous mixture in the shortest possible time an amount of from about 20% to 30% water is used. This amount also makes a paste which is easy to process, i.e. to extrude or pelletize and dry, in order to form the catalyst particles. The paste either can be extruded into pellets and dried, or dried partially first then pelletized from relatively dry particles. Once formed, the pellets are calcined usually at a temperature of from about 700° C. to about 1000° C. If combustible materials such as carbon, methyl cellulose, sawdust, wood flour and the like are used, the calcining temperature must be sufficient to volatilize or burn out such combustible materials.

In general, the small diameter catalyst pellets are normally more active than larger ones but larger diameters have the advantage of producing less pressure drop through the reactor.

The percentages of catalytic components may vary depending on the number or type of components used. The basic components are iron oxide, chromium oxide and an alkali metal oxide such as $K_2O$ and are employed in proportions so as to produce a catalyst having percentages as follows: $Fe_2O_3$, 60 to 90 wt. percent; $K_2Cr_2O_7$, 0.5 to 5.0 wt. percent; $K_2CO_3$, 8.5 to 30 wt. percent; and 1.0 to 5.0% cement. As is well known, the chromium alternatively may be provided as $Cr_2O_3$ or as an alkali metal compound which is heat decomposable to $Cr_2O_3$. Likewise the alkali metal carbonate may be added directly as the alkali metal oxide or as another compound which is heat decomposable to the oxide.

A preferred catalyst paste for preparing the catalyst to be used in making styrene in a process conducted under adiabatic conditions will contain 70–80% $Fe_2O_3$, 1–4% $K_2Cr_2O_7$, 17–22% $K_2CO_3$ and 2–4% cement. Up to about 15%, preferably 7–10%, each of methyl cellulose and graphite can be added, based on the total of the other components, including water of hydration in the yellow oxide. These are added for the purpose of modifying the pore structure of the catalyst and are burned off during the calcining step. The cement which may be Portland or alumina is also a pore modifier. Its function is to reduce the surface area by plugging the smaller pores in the catalyst.

In the adiabatic system steam is mixed with the ethylbenzene feed and the mixture passed over the catalyst. Additional heat, as needed, is provided by introducing steam to the feed stream at points further down the catalyst bed.

In the isothermal system the steam is added to the ethylbenzene just prior to its introduction into the catalyst, usually contained in tubes in a casing, similar in arrangement to a heat exchanger. Additional heat is provided by passing steam or flue gases through the casing surrounding the tubes containing catalyst. No additional steam is added to the reaction mixture as it passes through the catalyst.

The proper proportions of yellow to red oxides within the preferred ranges will vary depending upon the relative proportions of total iron oxide to the promoters and modifiers used in formulating the catalyst. These can be determined experimentally by those skilled in the art.

The following examples are provided to more fully illustrate the invention and to demonstrate the surprising advantages of using the defined mixture of yellow iron oxide and red iron oxide compared to using either one alone. Such examples are not to be construed, however, as limiting the scope of the invention.

EXAMPLE 1

A paste was prepared having a water content of 26% by weight (exclusive of water of hydration) and containing 10% each of methylcellulose and graphite based on the following catalyst composition:

| | Wt. percent |
|---|---|
| $Fe_2O_3$ | 70.7 |
| $K_2CO_3$ | 20.0 |
| $K_2Cr_2O_7$ | 3.0 |
| $V_2O_5$ | 3.0 |
| Cement | 3.3 |

The paste was extruded into pellets, dried and then calcined for two hours at 700° C.

Red iron oxide was employed as the iron oxide starting material for the catalyst designated as No. 1, yellow iron oxide for that designated No. 2 and a mixture of 40% by weight yellow oxide and 60% by weight red oxide for that designated No. 3.

Each of the catalysts 1, 2 and 3 prepared above was placed separately in an electrically heated 1 inch diameter stainless steel pipe containing 70 ml. catalyst. Preheated steam and ethyl benzene were fed over the catalyst bed at temperatures ranging between 600 and 660° C., as needed to adjust or maintain the conversion, at a steam to ethylbenzene ratio of 2:1 by weight, a back pressure of 5 p.s.i.g. and a liquid hourly space velocity of 1.0 ml. EB/ml. cat./hour. The temperature for a given run was controlled within a particular range to give the desired conversion. The results obtained at various conversions are shown in Table I below:

TABLE I

| | Wt. percent conversion of ethyl benzene | Selectivity to styrene (yield), wt. percent |
|---|---|---|
| Catalyst number: | | |
| 1 | 40 | 95.0 |
| 2 | 40 | 95.3 |
| 3 | 40 | 95.5 |
| 1 | 60 | 92.8 |
| 2 | 60 | 93.0 |
| 3 | 60 | 94.3 |
| 1 | 80 | 88.0 |
| 2 | 80 | 86.8 |
| 3 | 80 | 90.0 |

The above data shows the superiority of using a mixture of red and yellow oxides as the starting material for preparing dehydrogenation catalysts, especially when they are employed to convert a higher percent of ethylbenzene to styrene.

EXAMPLE 2

In a series of experiments identical catalysts were prepared, except for the proportions of yellow and red oxides used. These catalysts were then employed to produce styrene and conversion-selectivity values (CSV)* were obtained for each catalyst. The formulation of catalyst paste and preparation thereof was identical with that of Example 1.

Table II below shows the percentage of hydrated iron oxide in the original catalyst preparation and the CSV values obtained when using the catalyst to prepare styrene. The process conditions for converting ethyl benzene to styrene were constant in testing all of the different catalysts. Thus, the S/O weight ratio of steam to ethylbenzene (EB) was 2:1; the L.H.S.V. was 1.0. The temperature in the catalyst bed was maintained within the range of 600-660° C., and a back pressure of 5 p.s.i.g. was employed.

The process was conducted within the designated temperature range over the various catalysts so that a selectivity of 90% to styrene was obtained. The percent conversion at this selectivity was then obtained and the two numbers added to obtain the CSV value. Results are shown in Table II and plotted in FIG. 1.

TABLE II

| Hydrated $Fe_2O_3$ as percent of Total Iron Oxide: | CSV Value |
|---|---|
| 0 (all red oxide) | 164.5 |
| 10 | 160.5 |
| 20 | 165.0 |
| 25 | 165.5 |
| 30 | 166.0 |
| 35 | 166.7 |
| 40 | 167.5 |
| 60 | 164.3 |
| 70 | 165.3 |
| 75 | 166.0 |
| 85 | 163.0 |
| 100 (all yellow oxide) | 163.7 |

In order to show that the process of the invention is operative on catalysts containing larger amounts of iron oxide the following example was run. The catalysts compared herein do not have the $V_2O_5$ promoter which was present in both Examples 1 and 2 above.

EXAMPLE 3

Another catalyst made by the process of this invention (C) was compared with catalysts employing red oxide (A) and yellow oxide (B) as the sole sources of iron oxide. The three catalysts had the following composition:

| | Percent |
|---|---|
| $Fe_2O_3$ | 84.5 |
| $K_2CO_3$ | 10.0 |
| $K_2Cr_2O_7$ | 2.2 |
| Cement | 3.3 |

The catalyst components were made into a paste which contained 10% each of graphite and Methocel® based on the weight of the above components and extruded into 3/16" pellets. These were placed in an oven at ambient temperature which was then raised to 800° C. over a period of about 35 minutes and maintained at that temperature for about 3½ hours. The pellets were then cooled and 70 ml. of each catalyst was placed separately in a 1" diameter stainless steel reactor.

The iron oxide content of the composition used in all three catalysts is within the range taught in U.S. 3,360,579. The starting material for catalyst A is red iron oxide, catalyst B is yellow iron oxide and catalyst C is a mixture of the two oxides.

The dehydrogenation reaction was run by passing preheated steam and ethylbenzene over the catalyst which was maintained at or near 600° C. The L.H.S.V. was 1.0, the S/O ratio was 2:1 and the back pressure was 5.0 p.s.i.g., all of which conditions were the same as in Examples 1 and 2 above.

The reactor temperature was varied over a range of about 590°-620° C. Catalyst performance was compared at yields of 90% and at conversions of 60% as shown in the Table III below.

TABLE III

| Catalyst | CSV at 60% conversion | CSV at 90% yield |
|---|---|---|
| A (red $Fe_2O_3$) | 150.4 | 151.2 |
| B (yellow $Fe_2O_3$) | 150.9 | 155.0 |
| C (75% yellow, 25% red) | 151.5 | 156.5 |

*CSV—This is a numerical value obtained by adding the conversion and selectivity (yield to styrene) for a given run.

The superiority of a catalyst of the invention (C) is clearly shown whether one compares it at the same conversion or at the same selectivity.

The preceding examples employed conditions used for an adiabatic reactor system for the production of styrene. The catalysts prepared according to the process of this invention also can be employed in heated case reactors in which the temperature is controlled externally by passing steam (or other heat exchanging media) through a casing surrounding the reactor tubes. The heated case isothermal reaction also uses lower space velocities (ca. 0.5) and steam to oil ratios of about one.

In Example 4, using heated case conditions, the percentage of hydrate was varied in preparing a series of catalysts each of which had the same composition with respect to the active oxides, i.e. oxides of iron, potassium and chromium, and binder (cement). It should be noted that the operable upper rang of hydrate is shifted upwardly as compared to the range employed in the earlier examples using the adiabatic conditions. The lower range of hydrate is substantially the same although apparently it has been narrowed.

The results are reported in a different way than in the prior examples. Thus, the temperature required to get a particular conversion (60%) is determined and recorded. In this way temperatures, rather than yields, are compared. The lower the temperature required, the more active is the catalyst. Yields were all above 90%.

EXAMPLE 4

A catalyst was made having the same composition as in Example 3 except that no pore controlling agents, i.e. graphite or methyl cellulose, were used. It was calcined at 900° C.

In use the catalyst was placed in a tube of the same size and arrangement as that in Example 1. The process conditions employed for making styrene from ethylbenzene were those preferred for a heated case reactor system: L.H.S.V.=0.65, S/O ratio=1.0 and back pressure=5 p.s.i.g. The space velocity and S/O ratio are about half that used in the adiabatic system. Results are shown in Table IV.

TABLE IV

| Percent Yellow $Fe_2O_3$ Used in Preparation of Catalyst | Temp. (° C.) at 60% Conv. |
|---|---|
| 20 | 648 |
| 30 | 627 |
| 50 | 639 |
| 75 | 637 |
| 87 | 620 |
| 100 | 635 |

A plot of the above data (FIG. 2) shows that with the catalyst used for the heated case reactor systems the operable ranges which show improvement over the art employ from about 27 to about 43% and from about 79 to about 95% yellow iron oxide based on the total weight of iron oxide employed.

We claim:

1. In a process for preparing a catalyst for the dehydrogenation of alkyl aromatic hydrocarbons to vinyl aromatic hydrocarbons by preparing a paste consisting essentially of $Fe_2O_3$, $Cr_2O_3$ or an alkali metal chromate or dichromate decomposible to $Cr_2O_3$, an alkali metal oxide or an alkali metal salt decomposible to an alkali metal oxide, a binder and sufficient water to form said paste, forming said paste into pellets and calcining said pellets into a finished catalyst, the improvement which comprises employing as the $Fe_2O_3$ component a mixture of hydrated $Fe_2O_3$ and anhydrous $Fe_2O_3$ wherein the hydrated $Fe_2O_3$ is present in the range of from about 79 percent to about 95 percent of the total weight of iron oxides present.

2. The process of Claim 1 wherein the hydrated $Fe_2O_3$ is present in the range of from about 83 to 90 percent of the total weight of iron oxides.

3. The process of Claim 1 wherein the catalyst composition contains 1–5 percent by weight cement as binder based on the weight of active oxides and cement.

4. The process of Claim 1 wherein the catalyst paste contains 60 to 90 weight percent $Fe_2O_3$, 0.5 to 5 weight percent $K_2Cr_2O_7$, 8.5 to 30 weight percent $K_2CO_3$ and 1 to 5 weight percent cement.

5. The process of Claim 1 wherein the catalyst paste contains 70–80 weight percent $Fe_2O_3$, 1–4 weight percent $K_2Cr_2O_7$, 17–22 weight percent $K_2CO_3$, and 2–4 weight percent cement based on the total weight of active components and binder.

References Cited

UNITED STATES PATENTS

| 2,408,140 | 9/1946 | Gutzeit | 252—470 X |
| 2,603,610 | 7/1952 | Amos et al. | 252—470 |
| 2,683,123 | 7/1954 | Schwegler et al. | 252—470 |
| 2,866,790 | 12/1958 | Pitzer | 252—470 X |
| 3,360,579 | 12/1967 | Hills et al. | 252—470 X |

PATRICK P. GARVIN, Primary Examiner

W. J. SHINE, Assistant Examiner

U.S. Cl. X.R.

252—470; 260—669 R